(12) United States Patent
Dahlen et al.

(10) Patent No.: US 9,872,221 B2
(45) Date of Patent: Jan. 16, 2018

(54) CELL RESELECTION MECHANISM

(75) Inventors: Anders Dahlen, Vasterhaninge (SE);
Tomas Nilsson, Sollentuna (SE);
Magnus Sommer, Alta (SE)

(73) Assignee: TELIA COMPANY AB, Stockholm (SE)

( * ) Notice: Subject to any disclaimer, the term of this patent is extended or adjusted under 35 U.S.C. 154(b) by 334 days.

(21) Appl. No.: 14/238,956

(22) PCT Filed: Aug. 15, 2012

(86) PCT No.: PCT/EP2012/065926
§ 371 (c)(1),
(2), (4) Date: Apr. 8, 2014

(87) PCT Pub. No.: WO2013/024109
PCT Pub. Date: Feb. 21, 2013

(65) Prior Publication Data
US 2014/0242993 A1 Aug. 28, 2014

(30) Foreign Application Priority Data

Aug. 15, 2011 (FI) ..................... 20115799

(51) Int. Cl.
*H04W 36/00* (2009.01)
*H04W 36/30* (2009.01)

(52) U.S. Cl.
CPC ....... *H04W 36/30* (2013.01); *H04W 36/0083* (2013.01)

(58) Field of Classification Search
None
See application file for complete search history.

(56) References Cited

U.S. PATENT DOCUMENTS

| 7,773,990 B2 | 8/2010 | Ekstedt et al. |
| 7,898,997 B2 | 3/2011 | Lee et al. |
| 2004/0082328 A1 | 4/2004 | Japenga et al. |
| 2008/0089296 A1* | 4/2008 | Kazmi ............... H04B 7/264 370/336 |
| 2008/0227453 A1 | 9/2008 | Somasundaram et al. |

(Continued)

FOREIGN PATENT DOCUMENTS

| EP | 2 302 970 | 3/2011 |
| GB | 2464519 | 4/2010 |
| WO | 2009/057960 | 5/2009 |

OTHER PUBLICATIONS

International Search Report dated Dec. 5, 2012, corresponding to PCT/EP2012/065926.

(Continued)

*Primary Examiner* — Suhail Khan
(74) *Attorney, Agent, or Firm* — Young & Thompson

(57) ABSTRACT

A method to be utilized in cell reselection in a mobile communication network offers a cell reselection mechanism based on absolute priorities. The mobile terminal measures several characteristics of a radio channel. The mobile terminal is configured to determine for each of the cells if the characteristics of the radio channel meet corresponding predetermined criteria compared to the received threshold values, and in response to outcome of the comparison determining at least one radio channel for reselection of a cell. A mobile terminal and a system for implementing the method are also described.

9 Claims, 6 Drawing Sheets

(56) References Cited

U.S. PATENT DOCUMENTS

2009/0088160 A1    4/2009  Pani et al.
2009/0318140 A1*  12/2009  Gamel ................. H04W 36/30
                                                              455/432.1
2010/0240371 A1*   9/2010  Cook ................ H04W 36/0083
                                                              455/436
2011/0207459 A1*   8/2011  Ramasamy ....... H04W 36/0061
                                                              455/436

OTHER PUBLICATIONS

Finnish Search Report dated Jun. 5, 2012, corresponding to the Foreign Priority Application No. 20115799.
Himke Van Der Velde; "Control Plane Protocols"; John Wiley & Sons, Ltd.; Feb. 20, 2009; pp. 51-78.
Jordi Perez-Romero, et al.; "RRM Algorithms"; John Wiley & Sons, Ltd.; Jun. 17, 2005; pp. 177-301.

* cited by examiner

CELL RESELECTION MECHANISM

TECHNICAL FIELD

The invention concerns in general the technical field of cell based mobile communications. Especially the invention concerns cell reselection in an environment where a mobile terminal is capable of selecting a serving cell among multiple cells around.

BACKGROUND OF THE INVENTION

Modern mobile telecommunication networks are mainly based on cell based technology. The idea is that the network consists of cells next to each other covering a certain geographical area. More specifically each of the cells comprise a base station, which is a network element offering the wireless connection i.e. radio channel for the mobile terminals camping in that specific cell. Depending on the network technology the mobile terminals are controlled from the network side in such a manner that the mobile terminal when moving in the area does not face any problems to initiate a connection. The mobile terminal gets information from the network on what to measure and under what circumstances it should reselect from serving cell to another cell. Based on this information the mobile terminal determines when to reselect cell and to what cell, without communicating measurements to the network. This phenomenon in which a terminal is moving from one base station to another is known as cell reselection.

A cell reselection is a process for confirming a solid operation between a terminal and network when the terminal is moving in the network. More specifically, the cell reselection is what the terminal does when it is in idle state or in a connected state with no or very little data communication with the network. The mobile terminal communicates with the network by signaling procedures. The terminal can be in Idle, CELL_FACH, CELL_PCH or URA_PCH when performing cell reselection in UTRAN (Universal Terrestrial Radio Access Network).

At cell reselection the network delivers parameters and priorities to the mobile terminals. The terminals use the information, perform measurements and determine to change cell on its own. The terminal decides to what cell to reselect to.

As can be assumed there needs to be a mechanism to control and manage the cell reselection. There needs to be a mechanism for defining a cell, which is to be selected as a next serving cell, when the terminal is moving in the area. The goal in cell reselection process is that a mobile terminal is always served by such a base station, which offers the best radio channel according to terminal needs.

The cell reselection process becomes a challenging task to implement especially, when the terminal is capable of communicating with multiple radio access technologies and in the area where the terminal is camped there are multiple networks based on different radio access technologies available. Thus, the cell reselection process needs to be implemented in such a manner that it serves the general needs of the terminal, but does not bring any unnecessary effects, such as excessive radio channel measuring causing e.g. charging of battery in a mobile terminal to run out too fast.

The cell reselection mechanism is generally based on the procedure in which a terminal makes measurements in relation to characteristics of predefined radio channels by the network. The network defines system information containing at least the carrier frequencies to measure on and possibly what cells to measure on. Cells that belong to the frequency carrier or to the explicit cells that are to be measured are, in general, allowed cells to reselect to and often called neighboring cells. The system information is delivered to mobile terminals by the base station and the system information is specific to that cell. Worthwhile to mention is that the cell reselection criteria are described in a standard corresponding to the radio technology in use.

Cell reselection may be based on different types of reselection. Generally known alternatives are so called intra-frequency, inter-frequency and inter-RAT (Radio Access Technology) cell reselections. Intra-frequency neighbor cell measurements are performed by a mobile terminal when the current i.e. serving and target cell operates on the same carrier frequency. Inter-frequency neighbor cell measurements are performed by the user terminal when the neighbor cell operates on a different carrier frequency, compared to the current serving cell, but the same radio access technology as the current serving cell. Similarly, inter-RAT measurements are performed by the user terminal when the neighbor cell operates on another radio access technology than the current serving cell.

As already disclosed the cell reselection measurements are performed by a user terminal. The user terminal is configured to measure such parameters i.e. characteristics of radio channel of currently serving cell and neighboring cells that are necessary for cell reselection. The network informs the mobile terminal on the characteristics to be measured explicitly or implicitly by sending some threshold parameter that is related to a measure. Typically such characteristics are measures relating to a signal strength and/or signal quality. For instance, in radio access technology known as Universal Terrestrial Radio Access Network (UTRAN; WCDMA) such measure relating to signal strength is known as CPICH RSCP (Common Pilot Channel Received Signal Code Power) and measure relating to signal quality is known as CPICH Ec/No (The received energy per chip of the Common Pilot Channel divided by the power density in the frequency band). Correspondingly, for radio access technology called LTE (3GPP Long Term Evolution) measure relating to signal strength is known as RSRP (Reference Signal Received Power) and measure relating to signal quality is known as RSRQ (Reference Signal Received Quality).

One further aspect relating to cell reselection is that it is possible to indicate a camping priority for each frequency in the system information. This is called absolute priorities. Each frequency carrier indicated in the system information is classified by a parameter describing its priority, e.g. with a number from 0 to 7. The mobile terminal is configured to reselect to a cell that has the highest absolute priority among the cells that fulfills other criteria defined for finding the candidate cells for reselection. If no absolute priority is indicated for any inter-frequency then offset based cell reselection is applied for inter-frequency cell reselection. The offset based reselection simply means an utilization so called offset value in decibels, where the mobile terminal compares all cells with each other including the serving cell. The inter-RAT (E-UTRAN (Evolved UTRAN) and GERAN (GSM EDGE Radio Access Network)) priorities have to be different from the priority of the serving UTRAN cell's frequency. If no absolute priority is indicated for any GERAN frequency then offset based cell reselection is applied for inter-RAT cell reselection to GERAN.

In addition to absolute priorities the network can also support so called dedicated priorities. The core network can provide with an index (called Subscriber Profile Identity (SPID) or RAT/Frequency Selection Priority (RFSP) for a certain terminal to the radio network controller (RNC). The RNC maps the index to a frequency priority list. The RNC provides the UE with its dedicated priority list by dedicated RRC (Radio Resource Control) signaling. The UE uses the dedicated priorities at cell reselection, hence dedicated priorities overrides absolute priorities sent in system information.

A general principle of absolute priority based cell reselection is illustrated in FIG. 1, which may also be applied in mobile terminals using dedicated priorities received from the network. There are shown two exemplified situation, which the terminal may face. First one is that the terminal notices that the signal quality in general in the serving cell is below a threshold level ($Thresh_{serving,Low}$). In such a situation the terminal is allowed to reselect a lower priority cell if the measured value indicating the quality of the radio channel of the lower priority cell is above a threshold ($Thresh_{x,Low}$) set to that lower priority cell. Similarly, in situations where the radio channel quality of the serving cell is good i.e. on the level ($S_{NonIntrasearch}$), where the terminal searches only higher priority cells, the terminal may reselect to a higher priority cell if a characteristic of a radio channel in the higher priority cell exceeds a threshold ($Thresh_{x,High}$) level set for the higher priority cell. $S_{NonIntrasearch}$ is a level above which only cells with higher priority layers are searched and below which the search is accomplished to cells with any priority.

For determining if the serving cell has an acceptable signal strength level for camping on it, so called S-criteria is used. It basically defines the coverage of the serving cell. It is applicable both when priorities and when offsets are used for cell reselection. Usually cell reselection is triggered before the S-criteria level is reached.

As an alternative to the signal quality evaluation as described above, the signal strength can also be used for cell reselection evaluation. Thus, the signal strength of serving cell is compared if it is below a threshold level ($Thresh_{serving,Low}$) and if that is the case the terminal is allowed to reselect a lower priority cell if the measured signal strength of the radio channel of the lower priority cell is above a threshold ($Thresh_{x,Low}$). Similarly, higher priority cells are reselected if signal strength of radio channel in the higher priority cell exceeds a threshold ($Thresh_{x,High}$). Then acceptable signal quality of serving cell may be checked by S-criteria.

Utilization of either measure indicating signal strength or a measure indicating signal quality as a characteristic of a radio signal may cause serious problems. For example, in UTRAN the CPICH RSCP gives information on the coupling loss, but does not say anything on the interference. On the other hand, CPICH Ec/No is a composite measure of coupling loss and downlink interference. Furthermore, it has been found out that CPICH RSCP is a good measure of uplink quality and similarly CPICH Ec/No is a good measure for downlink quality in UTRAN. Thus, if either of the measures is used only, it is possible that either the uplink or downlink connection fails when initiating a connection even if the link in the opposite direction experiences no problems.

More specifically, the same problem exist both when measuring the characteristics in the serving cell or in any neighboring cells. In case of measurement of the characteristics of the serving cell it may cause the mobile terminal to stay camped too long time to that specific cell due to the misinterpretation of the general quality of the cell based only on one character. Similarly, when the terminal is reselecting a target cell, and if the reselection is based only on one character relating to a radio channel of the target cell, it may cause the terminal to reselect such a cell that has very bad link to either of the directions, which was not measured.

In the worst case the mobile terminal may end up to a situation, in which continues ping-pong cell reselections happen i.e. the mobile terminal selects back and forth between the same cells due to faulty measurement results and their analysis. A concept called hysteresis is utilized for avoiding the ping pong effect. The hysteresis is how much a radio channel measure on serving cell has to increase and/or on target cell has to decrease after reselection to target cell to make the serving cell allowed for cell reselection again. The amount of hysteresis shall be defined by means of threshold selection in such a manner that the mobile terminal gets enough candidates for target cells as a result of measurements, but at the similar time the risk for ping pong is minimized. More specifically, by increasing the hysteresis the reselection rate may be reduced. On the contrary, for a given measurement time interval called treselection, there is an optimal amount of hysteresis that maximizes cell quality by preventing the UE from making wrong reselection decisions in case of large signal fluctuations (as expected higher hysteresis is required for smaller values of Treselection). Utilization of either measure indicating signal strength or a measure indicating signal quality as a characteristic of a radio channel to determine when to reselect to target cell gives a hysteresis only on one measure. When the opposite measure is closed to S-criteria a small change in this measure may lead to reselection back and forth.

SUMMARY AND SHORT DESCRIPTION OF THE INVENTION

The objective of the current invention is to improve the cell reselection process in such a manner the above described negative effects can be minimized and/or avoided and the operation of the mobile terminal can be improved.

The objectives of the invention are achieved by utilizing multiple values indicating characteristics of a radio channel and corresponding thresholds for evaluating a quality of a radio channel and based on comparison finding such radio channels, which could be reselected if the cell reselection is initiated.

A method according to the invention is characterized by the steps recited in the characterizing part of the independent claim directed to a method.

A mobile terminal according to the invention is characterized by the features recited in the characterizing part of the independent claim directed to a device.

According to an aspect of the invention that a mobile terminal stays camped too long time on a serving cell can be solved by configuring the mobile terminal to measure a value indicating signal strength and a value indicating signal quality as characteristics of a radio channel for the serving cell. Furthermore, the terminal is configured to compare the measured values to corresponding threshold value received from the network in system info broadcasting. FIGS. 1a-1c illustrates some ways to deliver system information to mobile terminals.

If the comparison indicates that either the measure indicating signal strength for the serving cell is below a threshold or the measure indicating signal quality is below a threshold, the mobile terminal is allowed to reselect to a cell of lower and/or equal priority as the serving cell. This should be understood as the mobile terminal evaluates both measures sequentially or in parallel. At sequential evaluation, the mobile terminal first evaluates if one of the signal characteristics of a radio channel for the serving cell is below a threshold, and if not satisfied then a second signal characteristics of a radio channel for the serving cell is evaluated determining whether below a threshold or not. This aspect of the invention is equally applicable to cell reselection based on absolute priorities as dedicated priorities.

In response to the permission derived from the comparison described above a cell to be reselected needs to be determined. The determination of a cell to be reselected is carried out by measuring values indicating signal strengths and values indicating signal quality of neighboring cells. These measurements are carried out according to priority layers i.e. cells having lower priority than the serving cell, cells having equal priority as the serving cell and/or cells having higher priority than the serving cell. In response to the measurement the measured values are compared to corresponding threshold values for each of the measured neighboring cells received through system info broadcasting. The comparison indicates which cells i.e. characteristics of a radio channel for each of the neighboring cells meet the predetermined criteria, such as a value indicating signal strength and a value indicating signal quality are above the corresponding thresholds. This should be understood as the mobile terminal evaluates both measures sequentially or in parallel. At sequential evaluation, the mobile terminal first evaluates if one of the signal characteristics of a radio channel for the neighboring cell is above a threshold, and if satisfied then a second signal characteristics of a radio channel for the serving cell is evaluated determining whether below a threshold or not. Information on neighboring cells meeting the criteria are collected and based on this list the mobile terminal is allowed to make the reselection of a cell. If there are multiple cells in the list after the criteria check, the cell with highest absolute priority layer is selected. If more than one cell meets the above criteria, the terminal reselects the cell with the highest signal strength among the cells meeting the criteria on the highest absolute priority layer. For equal priorities the mobile terminal selects the strongest cell including the serving cell in the evaluation. This aspect of the invention is equally applicable to cell reselection based on dedicated priorities.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 1:
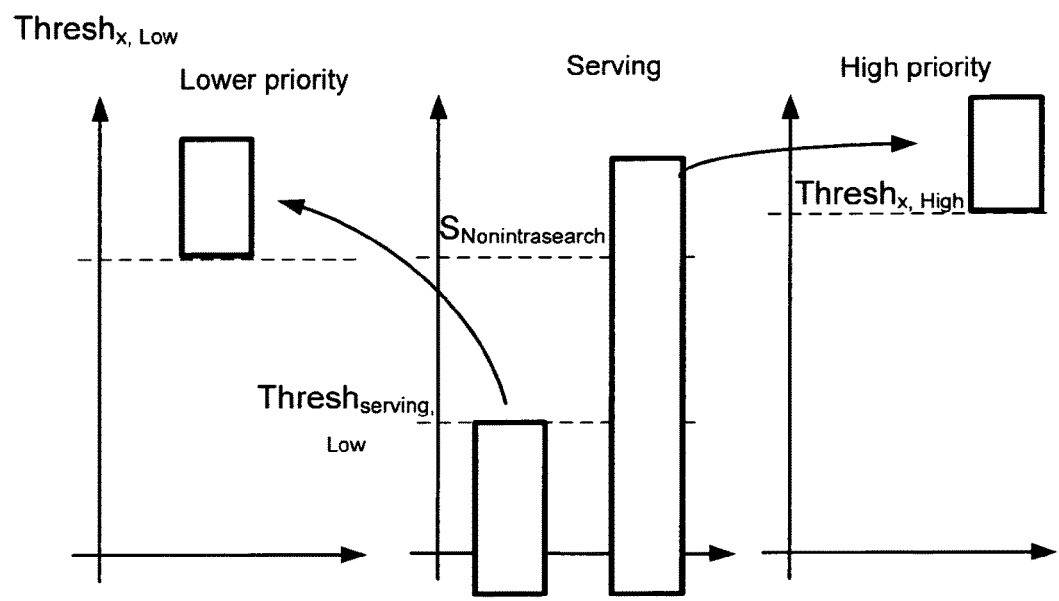
FIG. 1 illustrates a principle for absolute priority based cell reselection,
FIG. 2 a-c illustrate different types of delivering the system information to the mobile terminals,
FIG. 3 a-b illustrate the operation in the mobile terminal into which the system information is stored.

A method of determining a cell for cell reselection in a cell based mobile communication network in which a mobile terminal is measuring characteristics of a radio channel with respect to a cell serving the mobile terminal and at least one neighboring cell and receiving system information comprising information on at least a radio channel to be measured and a criterion of cell reselection, and in which the cell reselection is at least partly based on priorities between the cells. According to the method it is measured at least two characteristics, such as a characteristic of a radio channel indicating signal strength and a characteristic of a radio channel indicating signal quality, for the serving cell and at least one neighboring cell included in the system information comprising at least information on at least a radio channel to be measured and a criterion of cell reselection. The mobile terminal is configured to receive the system information i.e. at least threshold values for each carrier frequency to be measured or each of the radio channels to be measured, the threshold values comprising a value at least for two characteristics of a radio channel for each of the carrier frequencies or for each of the cells. Further, it is determined for each of the cells if the characteristics of the radio channel meet corresponding predetermined criteria compared to the received threshold values, where at least one cell is evaluated on at least two different signal characteristics of a radio channel, and in response to outcome of the comparison determining at least one radio channel for reselection of a cell.

According to an embodiment of the invention if the comparison of the characteristic of a radio channel indicating signal strength for the serving cell with the corresponding threshold or if the comparison of the characteristic of a radio channel indicating signal quality for the serving cell with the corresponding threshold meet a criteria, and where at least both characteristics are required to be verified towards criteria if one characteristic does not satisfy the criteria, the mobile terminal is allowed to leave the serving cell.

According to some further embodiment of the invention if the comparison of the characteristic of a radio channel indicating signal strength for the at least one neighboring cell and the characteristic of a radio channel indicating signal quality for the at least one neighboring cell with the corresponding threshold meet the criteria, and where at least both characteristics are required to be verified towards criteria even if one characteristic satisfies the criteria, at least one cell is set into candidate list for cell reselection.

According to some further embodiment of the invention if the serving cell characteristic indicating signal strength is below its threshold or if the serving cell characteristic indicating signal quality is below its threshold, and where at least both characteristics are required to be verified towards threshold if one characteristic is not below the threshold, and the neighbor cell characteristic indicating signal strength is above its threshold, the mobile terminal is triggered to reselect to the neighbor cell.

According to some further embodiment of the invention if the serving cell characteristic indicating signal strength is below its threshold or if the serving cell characteristic indicating signal quality is below its threshold, and where at least both characteristics are required to be verified towards threshold if one characteristic is not below the threshold, and the neighbor cell characteristic indicating signal quality is above its threshold, the mobile terminal is triggered to reselect to the neighbor cell.

According to some further embodiment of the invention if the serving cell characteristic indicating signal strength is below its threshold and the neighbor cell characteristic indicating signal quality is above its threshold and the neighbor cell characteristic indicating signal strength is above its threshold, and where at least both characteristics are required to be verified towards threshold even if one characteristic is above threshold, the mobile terminal is triggered to reselect to the neighbor cell.

According to some further embodiment of the invention if the serving cell characteristic indicating signal quality is below its threshold and the neighbor cell characteristic indicating signal quality is above its threshold, and where at least both characteristics are required to be verified towards threshold even if one characteristic is above threshold, and the neighbor cell characteristic indicating signal strength is above its threshold, the mobile terminal is triggered to reselect to the neighbor cell.

The triggering shall be understood as initiating a reselection of a cell and/or determining instruction and functions to initiate the reselection.

The system information to at least one mobile terminal can be delivered by multiple means. It can be delivered with broadcast message originating from each of the cells or it can be delivered in a radio resource control (RRC) signaling dedicated to a mobile terminal. As said the broadcasting can be done as cell based i.e. each cell send only information relating to it, or the broadcast messages may comprise information on multiple cells.

Figure 2A:
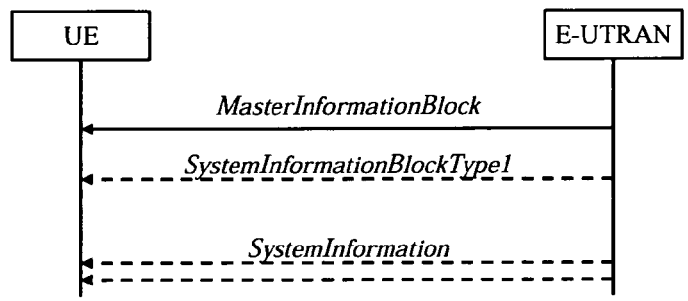
Figure 2B:
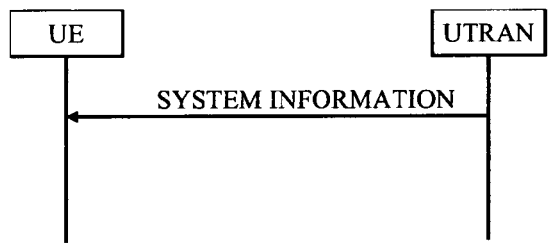
Figure 2C:
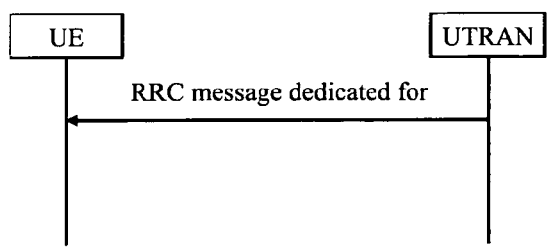
Figure 3A:
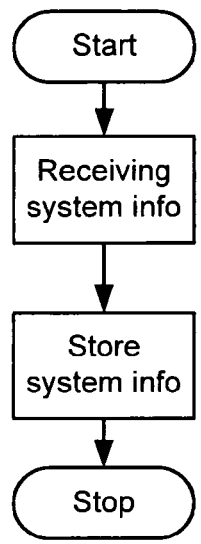
Figure 3B:
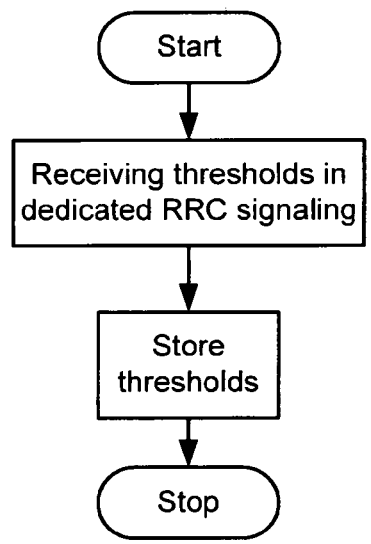

FIGS. 2a-2c illustrate different types of delivering the system information to the mobile terminals and FIGS. 3a-3b illustrate the operation in the mobile terminal into which the system information i.e. system info is stored. The basic principle in the delivery of system information is that the network defines the information in the system info message and delivers it to the terminal or terminals. Similarly, the basic principle in the terminal end is that the terminal devices receives the system information and stores it. The system information can be delivered as broadcasted message or dedicated message over RRC.

According to some embodiments of the invention a new set of threshold values is configured to override the existing threshold values in the mobile terminal.

According to some further embodiments of the invention the existing threshold values are reused in the mobile terminal in the comparison. The existing threshold values can be modified with some pre-agreed method.

According to some further embodiments at least one new threshold value is configured to be received and configured to override the corresponding existing threshold value. At the same time some other threshold value may be reused in the mobile terminal in the same comparison.

Figure 4:
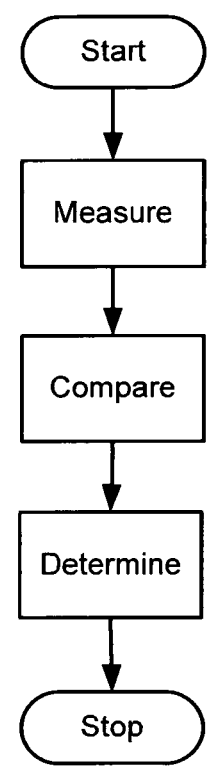
FIG. 4 illustrates the method according to the invention.

FIG. 4 illustrates the method according to the invention on a general level and shows the method steps as described above.

A mobile terminal according to the invention comprises processing means for enabling the operation of the mobile terminal according to the method. The mobile terminal comprise necessary processing means for implementing the method and storage means for storing instructions for operating according to the method. Furthermore, the mobile terminal according to the invention comprises radio access means for communicating with the network accordingly.

The mobile communication network together with the mobile terminals establishes a system, in which the cell reselection accordingly can be implemented.

As a further aspect of the invention relating to at least some embodiments described herein the network sends information in each cell about thresholds for the serving cell and thresholds for the carrier frequencies to be measured. It sends priorities for each carrier frequency and what frequencies to measure. If some threshold parameters are included signal strength is used as measure for that carrier, if some thresholds are included then signal quality is used as measure, if "all" threshold parameters are included both measures are used. For example, in UTRAN the thresholds of serving cell and the thresholds of neighbor cells (inter-freq and inter-RAT) is the same message and same system information block, called SIB19. In e.g. LTE all information is in same message but different Information Elements in the message, SIB3 for serving cell thresholds, SIB 5 contains inter frequency thresholds, SIB 6 UTRAN thresholds and SIB7 GERAN thresholds.

FURTHER ASPECTS WITH RESPECT TO THE INVENTION

The following paragraphs illustrate further aspects to the invention i.e. by taking the invention closer to the existing telecommunication technologies. It shall be understood that the following aspects do not limit the inventive idea anyhow.

The uplink and downlink measurements play important role when evaluating channel quality as a whole. For uplink direction one shall bear in mind that the output power of the terminal (UE) depends on the coupling loss to the base station i.e. Node B in UMTS, and the interference level at the node B. The interference level is the same for all links in the same cell but does vary between cells (about 0 to 5 dB noise rise), but this variation is much smaller than the variation of the coupling loss (at least 50 to 60 dB). This means that the UE output power is determined mainly by the coupling loss to the Node B. Since uplink coverage is limited by the UE output power, the uplink quality will be strongly dependent on the coupling loss and hence on the CPICH RSCP.

Also in the downlink the required output power depends on the coupling loss and the interference, but here the interference is the interference received at the UE, and is thus different for different locations within a cell. Furthermore, the variation of the downlink interference is of the same order of magnitude as the variation of the coupling loss. In fact, the incell interference is subject to the same coupling loss as the real signal, and is thus proportional to the coupling loss (this is not true for the other cell interference). Interference can thus, obviously not be neglected, and RSCP is useless as a measure of downlink quality. Ec/No on the other hand does give a composite measure of coupling loss and downlink interference, and it is clear that Ec/No does provide a good estimate of downlink quality.

Worthwhile to mention is that for EUTRAN, RSRP will be a good measure of uplink and RSRQ will be a measure of downlink. The problems here may also be applicable to EUTRAN even though the problem may be less due to EUTRAN has no in cell interference. In LTE one can use RSRP or RSRQ as measure for cell reselection, not both simultaneously.

Figure 5:
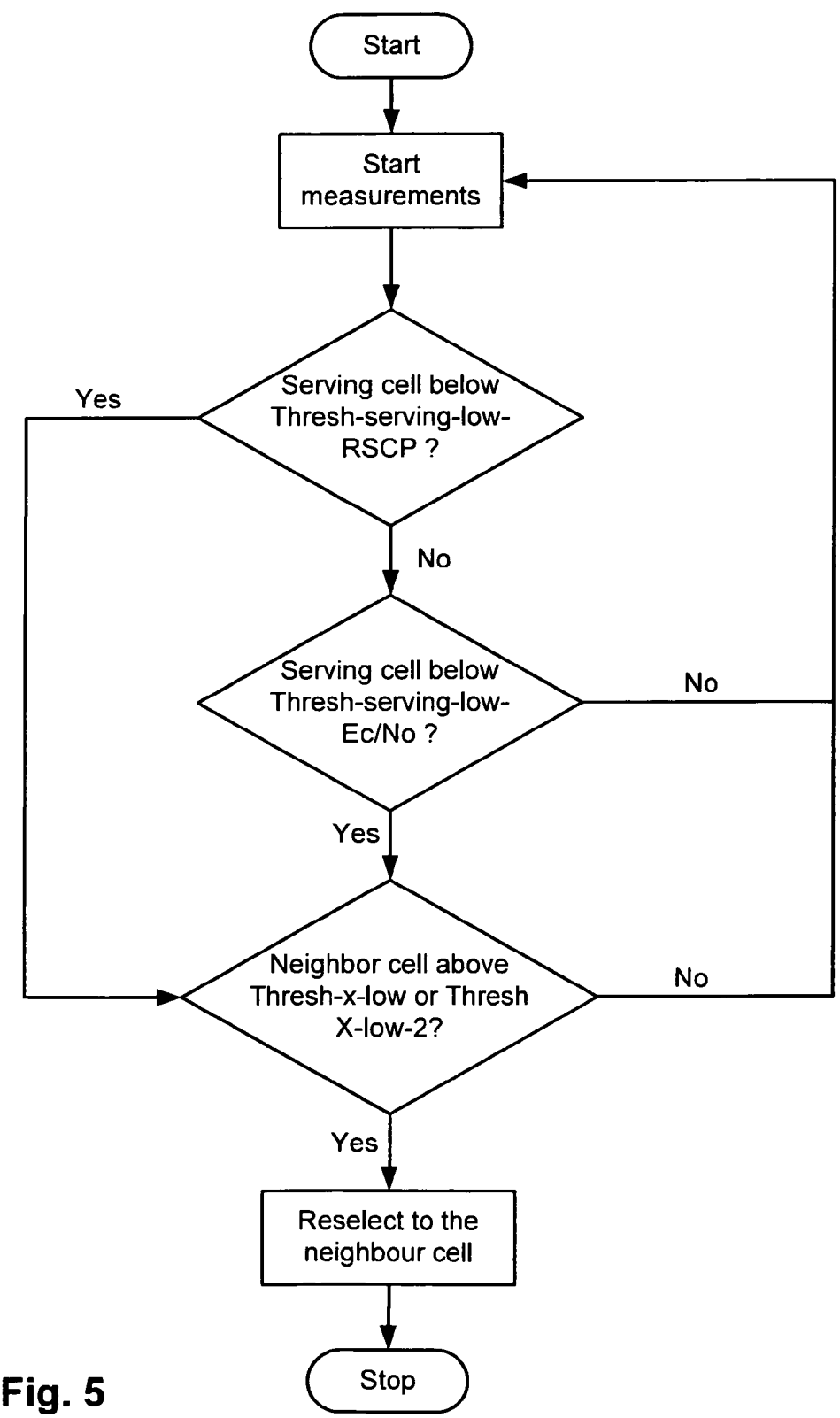
FIG. 5 illustrates an embodiment of the method according to the invention.

Here the reference is made to the FIG. 5 which illustrates an embodiment of the method according to the invention. As it has been discussed the threshold values for the terminals are sent from the network in the system information broadcast for cell reselection. The delivery and application of parameters can be implemented e.g. in the following ways: the parameters could be a new set of parameters that are over riding current parameters if available, or one of the parameters could be a re-use of the current $Thresh_{serving,low}$ and a new parameter for Ec/No is added or both parameters could be a reuse of the current $Thresh_{serving,low}$ for RSCP and $Thresh_{serving,low2}$ for Ec/No.

In addition or as an alternative to broadcasting the parameters in the system information the parameters may be sent to the terminals by dedicated RRC signalling, for example together with dedicated priorities.

In the cell reselection rules i.e. criteria according to some examples of the invention the terminal uses both CPICH Ec/NO $Tresh_{serving,low}$ and CPICH RSCP $Tresh_{serving,low}$ for cells of lower and equal priority. The cell reselection rules could be:

Cell reselection to an inter-frequency cell on an equal absolute priority layer to the camped frequency shall be performed if criterion 2 is fulfilled.

Criterion 2: ($Srxlev_{ServingCell} < Thresh_{serving,low\ RSCP}$ or $Squal_{ServingCell} < Thresh_{serving,low\ EcNo}$) and the $Srxlev_{nonservingCell,x}$ of a inter-frequency cell on an evaluated equal absolute priority layer is greater than $Thresh_{x,low}$ during a time interval Treselection;

Cell reselection to an inter-frequency or inter-RAT cell on a lower absolute priority layer than the camped frequency shall be performed if criterion 3 or 5 is fulfilled. Criterion 5 is only checked if $Thresh_{x,low2}$ is provided, and this parameter can only be provided for LTE neighbour cells.

Criterion 3: ($Srxlev_{ServingCell} < Thresh_{serving,lowRSCP}$ or $Squal_{ServingCell} < Thresh_{serving,lowEcNo}$ and the $Srxlevnon_{ServingCell,x}$ of a cell on an evaluated lower absolute priority layer is greater than $Thresh_{x,low}$ during a time interval Treselection;

Criterion 5: $Srxlev_{ServingCell} < Thresh_{serving,lowRSCP}$ or $Squal_{ServingCell} < Thresh_{serving,low\ EcNo}$ and the $Squal_{nonServingCell,x}$ of a cell on an evaluated lower absolute priority layer is greater than $Thresh_{x,low2}$ during a time interval Treselection.

Note that if $Srxlev_{ServingCell}$ does not satisfy the inequality then $Squal_{ServingCell}$ inequality needs to be checked, or vice versa.

Here the Srxlev refers to measured signal strength (e.g. CPICH RSCP for UTRAN, RSRP for E-UTRAN) minus a parameter called Qrxlevmin (the minimum received signal level defined for the cell (broadcast information)) and minus Pcompensation correspondingly. Squal refers to measured signal quality (Ec/No for UTRAN, RSRQ for E-UTRAN) minus a parameter called Qqualmin. Tresh terms refer to threshold parameters given to the UE in system information. Furthermore, subscript serving means serving cell and subscript X means neighboring cell.

The terminal measures RSCP and Ec/No of neighbour UTRAN cells for cell reselection to lower, equal and/or higher priority. If the neighboring UTRAN cell RSCP is above a threshold and Ec/No is above a threshold then the UEs are allowed to reselect to the UTRAN cell, which can be of lower, equal or higher priority.

According to some alternative embodiment of the invention $Thresh_{serving,low}$ to a very high value and then $S_{prioritysearch1}$ and $S_{prioritysearch2}$ parameter to a low value. In this equal and low priority cells are not measured and cannot be reselected even though $Thresh_{serving,low}$ is high. When serving cell Ec/No goes below $S_{prioritysearch2}$ or RSCP goes below $S_{prioritysearch1}$ then measurements starts and since $Thresh_{serving,low}$ is very high the terminal UE is always allowed to leave the serving cell for an equal priority or lower priority cell when measurements are activated. In the situation the measurements rules for inter-frequency layers with a priority equal or lower than the priority of the current serving layer can be:

If $Srxlev_{ServingCell} > S_{prioritysearch1}$ and $Squal_{ServingCell} > S_{prioritysearch2}$ the UE may choose not to perform measurements of inter-frequency layers of equal or lower priority.

If $Srxlev_{ServingCell} <= S_{prioritysearch1}$ or $Squal_{ServingCell} <= S_{prioritysearch2}$ the UE shall perform measurements of inter-frequency layers of equal or lower priority.

Figure 6:
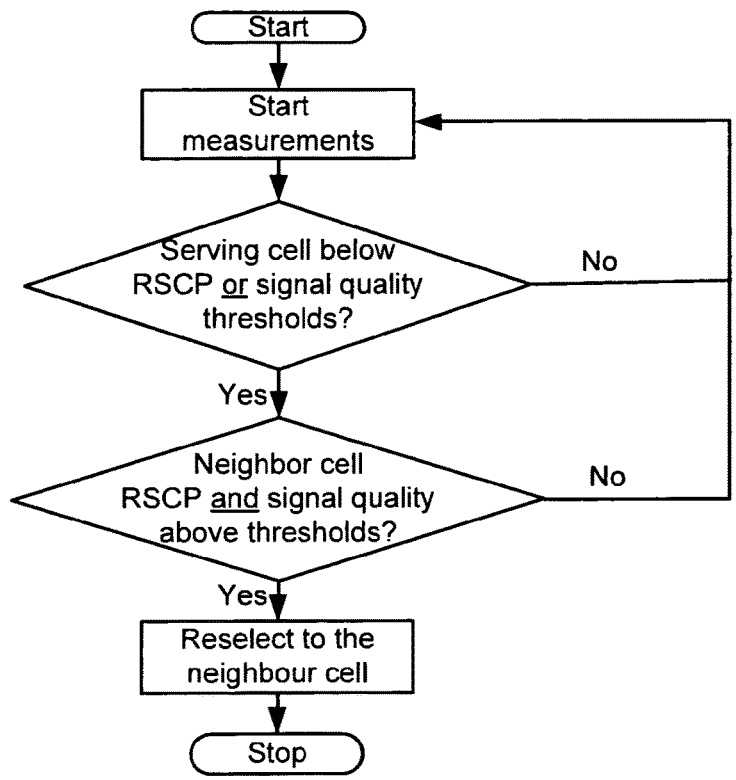
FIG. 6 illustrates an embodiment of the method according to the invention.

In some further embodiments of the invention the reselection to lower and equal priority cells can be made as described in the following by referring also to FIG. 6. Again, $Thresh_{x,low}$ for both CPICH Ec/NO and CPICH RSCP are introduced in the system information broadcast for cell reselection. The threshold parameter can be introduced e.g. in the following ways: the parameters could be a new set of parameters that are over riding current parameters if available, or one of the parameters could be a re-use of the current $Thresh_{x,low}$ and a new parameter for Ec/No is added.

In addition or as an alternative to broadcasting the parameters in system information the parameters may be sent to the UEs by dedicated RRC signalling, for example together with dedicated priorities.

In the cell reselection rules the terminal uses both CPICH Ec/NO $Thresh_{x,low}$ and CPICH RSCP $Thresh_{x,low}$ for cells of lower and equal priority. The cell reselection rules could be within this embodiment on the invention:

Cell reselection to an inter-frequency cell on an equal absolute priority layer to the camped frequency shall be performed if criterion 2 and criterion 6 is fulfilled. Criterion 6 is only checked if $Thresh_{x,low}$ EcNo is provided.

Criterion 2: ($Srxlev_{ServingCell} < Thresh_{serving,low}$ RSCP or $Squal_{ServingCell} < Thresh_{serving,low\ EcNo}$) and the $Srxlev_{nonServingCell,x}$ of an inter-frequency cell on an evaluated equal absolute priority layer is greater than $Thresh_{x,lowRSCP}$ during a time interval Treselection;

Criterion 6: $Srxlev_{ServingCell} < Thresh_{serving,lowRSCP}$ or $Squal_{ServingCell} < Thresh_{serving,low\ EcNo}$) and the $Squal_{nonServingCell,x}$ of an inter-frequency cell on an evaluated equal absolute priority layer is greater than $Thresh_{x,lowEcNo}$ during a time interval Treselection.

An alternative criteria saying the same thing as the two criteria above would be:

Criteria 2': ($Srxlev_{ServingCell} < Thresh_{serving,lowRSCP}$ or $Squal_{ServingCell} < Thresh_{serving,lowEcNo}$) and the $Srxlev_{nonServingCell,x}$ of an inter-frequency cell on an evaluated equal absolute priority layer is greater than $Thresh_{x,lowRSCP}$ and the $Squal_{nonServingCell,x}$ of same cell is greater than $Thresh_{x,lowEcNo}$ during a time interval Treselection.

Cell reselection to a UTRAN cell on a lower absolute priority layer than the camped frequency shall be performed if criterion 3 and criterion 5 is fulfilled. Criterion 5 is only checked if $Thresh_{x,low}$ EcNo are provided.

Criterion 3: ($Srxlev_{ServingCell} < Thresh_{serving,lowRSCP}$ or $Squal_{ServingCell} < Thresh_{serving,lowEcNo}$) and the $Srxlev_{nonServingCell,x}$ of a cell on an evaluated lower absolute priority layer is greater than $Thresh_{x,lowRSCP}$ during a time interval Treselection;

Criterion 5: ($Srxlev_{ServingCell} < Thresh_{serving,lowRSCP}$ or $Squal_{ServingCell} < Thresh_{serving,lowEcNo}$) and the $Squal_{nonServingCell,x}$ of a cell on an evaluated lower absolute priority layer is greater than $Thresh_{x,lowEcNo}$ during a time interval Treselection.

An alternative criteria saying the same thing as criteria 3 and 5 above would be:

Criterion 3': ($Srxlev_{ServingCell} < Thresh_{serving,lowRSCP}$ or $Squal_{ServingCell} < Thresh_{serving,lowEcNo}$) and the $Srxlev_{nonServingCell,x}$ of a cell on an evaluated lower absolute priority layer is greater than $Thresh_{x,lowRSCP}$ and the $Squal_{nonServingCell,x}$ of the same cell is greater than $Thresh_{x,lowEcNo}$ during a time interval Treselection.

Figure 7:
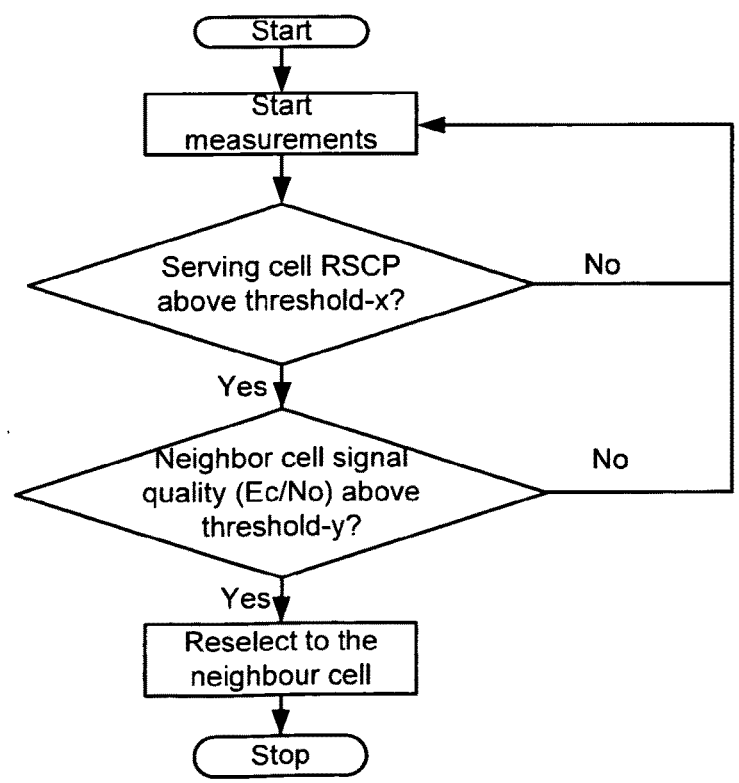
FIG. 7 illustrates an embodiment of the method according to the invention.

According to a further embodiment of the invention the reselection to a higher priority cells can be accomplished according to the following discussion and also with reference to FIG. 7. $Thresh_{x,high}$ for both CPICH Ec/NO and CPICH RSCP are introduced in the system information broadcast for cell reselection. The mentioned parameters can be implemented in the following ways: the parameters could be a new set of parameters that are over riding current parameters if available, or one of the parameters could be a re-use of the current $Thresh_{x,high}$ and a new parameter for Ec/No is added.

In addition or as an alternative to broadcasting the parameters in system information the parameters may be sent to the UEs by dedicated RRC signaling, for example together with dedicated priorities.

In the cell reselection rules the terminal uses both CPICH Ec/NO $Thresh_{x,high}$ and CPICH RSCP $Thresh_{x,high}$ for cells of higher priority. The cell reselection rules could be:

Cell reselection to an UTRAN cell on a higher absolute priority layer than the camped frequency shall be performed if criterion 1 and 4 is fulfilled. Criterion 4 is only checked if $Thresh_{x,highEcNo}$ is provided.

Criterion 1: the $Srxlev_{nonServingCell,x}$ of a cell on an evaluated higher absolute priority layer is greater than $Thresh_{x,highRSCP}$ during a time interval Treselection;

Criterion 4: the $Squal_{nonServingCell,x}$ of a cell on an evaluated higher absolute priority layer is greater than $Thresh_{x,highEcNo}$ during a time interval Treselection.

An alternative criteria saying the same thing as criteria 1 and 4 above would be:

Criterion 1': the $Srxlev_{nonServingCell,x}$ of a cell on an evaluated higher absolute priority layer is greater than $Thresh_{x,highRSCP}$ and the $Squal_{nonServingCell,x}$ of the same cell is greater than $Thresh_{x,highEcNo}$ during a time interval Treselection.

If more than one UTRAN cell meets the above criteria on higher, lower or equal priority, then the terminal UE reselects the cell with the highest signal strength ($Srxlev_{nonServingCell,x}$), i.e. highest CPICH RSCP, among the cells meeting the criteria on the highest absolute priority layer.

The invention may be applied to LTE (EUTRAN) serving cells by replacing CPICH RSCP with RSRP and CPICH Ec/No with RSRQ. The invention may be applied when measuring on UTRAN neighbor cells from LTE (EUTRAN) serving cells. Then the serving LTE cell is evaluated by RSRP and/or RSRQ and the neighbor UTRAN cell is evaluated on RSCP and Ec/No. The invention may be applied when measuring on LTE neighbor cells by replacing CPICH RSCP with RSRP and CPICH Ec/No with RSRQ.

Furthermore, the invention described herein is applicable, in addition to UTRAN, within EUTRAN respectively. Additionally, the inventive idea can be applied for inter-frequency and inter-RAT based cell reselection.

The invention claimed is:

1. A method of determining a cell for cell reselection in a cell-based mobile communication network, carried out by a mobile terminal where the mobile terminal measures characteristics of a radio channel with respect to a serving cell that serves the mobile terminal and at least one neighboring cell, the method comprising:

receiving system information comprising information on at least a radio channel to be measured and a criterion of cell reselection;

measuring at least a characteristic of a radio channel indicating uplink quality based on signal strength and a characteristic of a radio channel indicating downlink quality based on signal quality, for each of the serving cell and the at least one neighboring cell identified in the system information;

receiving individual threshold values from the communication network for each cell to be measured, the individual threshold values comprising an individual value at least for a characteristic of a radio channel indicating uplink quality based on signal strength and a characteristic of a radio channel indicating downlink quality based on signal quality for each of the cells of the network;

determining, for each of the cells of the network, whether both the characteristics of uplink quality and downlink quality of the radio channel meet a corresponding predetermined criterion included in each of the received individual threshold values, and recording information of every cell having characteristics that meet the corresponding predetermined criterion of uplink quality and downlink quality into a list of cells as candidates for cell reselection; and selecting, from the list, a cell having a highest absolute priority layer associated therewith for reselection, and in the event that more than one cell in the list has the same highest absolute priority layer, selecting a cell from said more than one cell having a highest characteristic of a radio channel indicating signal strength for reselection.

2. The method according to claim 1, wherein, in the event that either of the measured characteristic of the radio channel indicating uplink quality based on signal strength for the serving cell or the measured characteristic of the radio channel indicating downlink quality based on signal quality for the serving cell does not satisfy a corresponding threshold received from the communication network for the serving cell, triggering the mobile terminal to leave the serving cell for the selected cell.

3. The method according to claim 1, wherein the system information is delivered to the mobile terminal by means of at least one of the following: broadcast message originating from each of the cells of the network, and radio resource control (RRC) signaling dedicated to a mobile terminal.

4. The method according to claim 1, wherein receiving a new set of threshold values overriding the existing threshold values in the mobile terminal to be utilized in the comparison.

5. The method according to claim 1, wherein reusing the existing threshold values in the mobile terminal in the comparison.

6. The method according to claim 1, wherein receiving at least one new threshold value overriding the corresponding existing threshold value to be used in the comparison and reusing at least one another threshold value in the mobile terminal in the same comparison.

7. A mobile terminal, comprising means that are configured to implement the method steps according to claim 1.

8. A method of determining a cell for cell reselection in a cell-based mobile communication network, carried out by a mobile terminal where the mobile terminal measures characteristics of a radio channel with respect to a serving cell that serves the mobile terminal and at least one neighboring cell, the method comprising:
    receiving system information from the communication network, comprising information concerning radio communications with the serving cell and the at least one neighboring cell to be measured, and comprising criterion information of cell reselection, said system information including individual threshold values for each of the serving cell and the at least one neighboring cell;
    measuring at least a characteristic of a radio channel indicating uplink quality based on signal strength and a characteristic of a radio channel indicating downlink quality based on signal quality, for each of the serving cell and the at least one neighboring cell;
    comparing each of the measured characteristics of the uplink quality and the downlink quality of each of the serving cell and the at least one neighboring cell with corresponding ones of the threshold values received from the communication network; and
    in the event of
        i) either of the serving cell characteristic indicating uplink quality or the serving cell characteristic indicating downlink quality is below the threshold value individually corresponding thereto, and
        ii) either of the neighbor cell characteristic indicating uplink quality is above threshold or the neighbor cell characteristic indicating downlink quality is above the threshold value individually corresponding thereto,
    triggering the mobile terminal to reselect from the serving cell to the neighbor cell.

9. The method according to claim 8, wherein triggering of the mobile terminal to reselect from the serving cell to the neighbor cell takes place if both the neighbor cell characteristic indicating uplink quality is above the threshold value corresponding thereto and the neighbor cell characteristic indicating downlink quality is above the threshold value corresponding thereto.

* * * * *